United States Patent
Rasor

[11] Patent Number: 5,379,404
[45] Date of Patent: Jan. 3, 1995

[54] PLUG CODE FOR AUTOMATICALLY RECOGNIZING AND CONFIGURING BOTH NON-MICROPROCESSOR AND MICROPROCESSOR BASED RADIO FREQUENCY COMMUNICATION DEVICES

[75] Inventor: Gregg E. Rasor, Boynton Beach, Fla.

[73] Assignee: Motorola, Inc., Schaumburg, Ill.

[21] Appl. No.: 116,101

[22] Filed: Sep. 2, 1993

Related U.S. Application Data

[63] Continuation of Ser. No. 494,290, Mar. 16, 1990, abandoned.

[51] Int. Cl.$^6$ .......................... G06F 13/10; G08B 5/22
[52] U.S. Cl. ................................. 395/500; 364/221.8; 364/222.2; 340/825.04; 340/825.39; 340/825.44; 340/825.48; 379/10; 379/50; 379/97
[58] Field of Search ...................... 395/275, 500, 800; 370/17; 379/10, 14, 29, 57, 58, 97; 455/186; 340/825.24, 825.39, 825.44, 825.69, 825.04, 825.48

[56] References Cited

U.S. PATENT DOCUMENTS

| | | | |
|---|---|---|---|
| 3,828,326 | 8/1974 | Cash | 395/325 |
| 4,127,896 | 11/1978 | Raslavsky, III | 395/325 |
| 4,290,063 | 9/1981 | Traster | 340/723 |
| 4,378,551 | 3/1983 | Drapac | 340/311.1 |
| 4,410,962 | 10/1983 | Daniels et al. | 395/500 |
| 4,417,246 | 11/1983 | Agnor et al. | 340/825.44 |
| 4,481,574 | 11/1984 | DeFino et al. | 379/93 |
| 4,525,865 | 6/1985 | Mears | 455/186 |
| 4,535,403 | 8/1985 | Holland | 395/275 |
| 4,603,385 | 7/1986 | Mueller et al. | 395/500 |
| 4,604,686 | 8/1986 | Reiter et al. | 395/500 |
| 4,771,399 | 9/1988 | Snowden et al. | |
| 4,792,896 | 12/1988 | Maclean et al. | 395/500 |
| 4,855,905 | 8/1989 | Estrada et al. | 395/500 |
| 4,890,219 | 12/1989 | Heath et al. | 395/500 |
| 4,899,306 | 2/1990 | Greer | 395/500 |
| 4,931,924 | 6/1990 | Kageura | 395/500 |
| 4,945,473 | 7/1990 | Holtey et al. | 395/500 |
| 4,978,944 | 12/1990 | Andros et al. | 340/825.44 |
| 4,999,768 | 3/1991 | Hirokawa | 395/275 |
| 5,007,050 | 4/1991 | Kasparian et al. | 370/77 |
| 5,012,234 | 4/1991 | Dulaney et al. | 340/825.44 |
| 5,015,886 | 5/1991 | Choi et al. | 307/465 |
| 5,063,494 | 11/1991 | Davidowski et al. | 395/800 |
| 5,073,767 | 12/1991 | Holmes et al. | 340/311.1 |
| 5,252,964 | 10/1993 | Tan et al. | 340/825.48 |

OTHER PUBLICATIONS

Motorola Publication "Microprocessor, Microcontroller, and Peripheral Data, vol. I", Motorola Inc., 1988, pp. 3-932 to 3-938.
Motorola Publication "Key Note Series Radio Programming Software", Motorola Inc., 1989, p. 8.
Motorola; "Radio Programming Software User's Guide", pp. 1-19, 1989.

Primary Examiner—Parshotam S. Lall
Assistant Examiner—Krisna Lim
Attorney, Agent, or Firm—Gregg E. Rasor

[57] ABSTRACT

An electronic code plug programming apparatus and operating method that automatically recognizes and configures a radio frequency communication device without reference to a prestored signal in the radio frequency communication device. The programming apparatus uses a communication interface operating in either a first or second configuration using first and second signal sets, respectively. The first configuration and signal set allows communication with a non-microprocessor based radio frequency communication device while the second configuration and signal set allows communication with a microprocessor based radio frequency communication device. In response to the success or failure of a direct code plug read request communicated to an undetermined radio frequency communication device, a controller recognizes whether the device is microprocessor based without reference to a prestored signal therein and programs the device, configuring operational parameters according to its recognized capabilities.

7 Claims, 5 Drawing Sheets

PLUG CODE FOR AUTOMATICALLY RECOGNIZING AND CONFIGURING BOTH NON-MICROPROCESSOR AND MICROPROCESSOR BASED RADIO FREQUENCY COMMUNICATION DEVICES

This is a continuation of application Ser. No. 494,290, filed Mar. 16, 1990 and now abandoned.

FIELD OF THE INVENTION

This invention relates in general to programming devices and more particularly to a portable radio telephone programing device.

BACKGROUND OF THE INVENTION

The state of the art in achieving a radio's desired operating characteristics, or "personality" as it is commonly known, has readily advanced over the last five years. In the past, a radio's personality was determined at the time of assembly by combining unique components into a working unit. This is an expensive and inefficient method for manufacturing a multiplicity of models because of the large inventory that must be maintained in order to fulfill each customer order in a timely fashion. With the advent of high capacity digital decimal electronic signalling schemes in the paging industry, the need arose for a more efficient and cost effective means for manufacturing portable selective call radio receivers and transmitters. It was during the mid 1970's that the technology for the use of nichrome code plugs as a memory device became practical. The idea of a using pre-programmed fusible link code plug that could be read by a custom integrated circuit or a microprocessor revolutionized the paging industry. By using a nichrome code plug, the manufacturer could now design a fairly generic radio that could be configured to provide a wide variety of options by reading the state (electrical open or short circuits) of predetermined fusible links within the code plug and determining the desired operating mode accordingly. Nichrome code plugs were not without their problems as they are a one shot deal, that is, once you "blow" the links in the code plug, the radio's options relating to those links that are now fixed and cannot revert to their previous states. The fact that the links are permanently melted apart leads to the obvious conclusion that if you want to reprogram radio functions at a later date, you must replace the used code plug with a new one and reprogram the radio. Another problem with nichrome code plugs is that a substantial amount of electrical current is required to "blow" the links. Because of this, the radio itself is not able to program the code plug while installed. External programmers had to be developed to program and verify the nichrome code plugs.

With the development of low voltage EEPROM's (electrically erasable programmable read only memories) and other low power/low voltage memory devices such as battery powered static random access memory, portable radio devices can now be designed to take advantage of the permanent installation of these memory devices. They serve the same function as the nichrome code plugs but allow the manufacturer to further reduce the unit's cost to the customer by eliminating the need to replace the code plug. These devices also improve the reliability of the design by eliminating the temporary interconnects used to contact nichrome code plugs.

Another problem facing designers of portable radio products in the area of electronically configurable options is that all existing products require a microprocessor to control and interface the programming signals and data to the code plug.

Thus, what is needed is a method for recognizing and programing with minimal user intervention, a portable communication device's code plug to provide a dynamically reconfigurable personality for the portable communication device.

SUMMARY OF THE INVENTION

In carrying out the above, there is provided an electronic code plug programming apparatus and operating method that automatically recognizes and configures a radio frequency communication device without reference to a prestored signal in the radio frequency communication device. The programming apparatus uses a communication interface operating in either a first or second configuration using first and second signal sets, respectively. The first configuration and signal set allows communication with a non-microprocessor based radio frequency communication device while the second configuration and signal set allows communication with a microprocessor based radio frequency communication device. In response to the success or failure of a direct code plug read request communicated to an undetermined radio frequency communication device, a controller recognizes whether the device is microprocessor based without reference to a prestored signal therein and programs the device, configuring operational parameters according to its recognized capabilities.

DETAILED DESCRIPTION OF THE INVENTION

Figure 1:
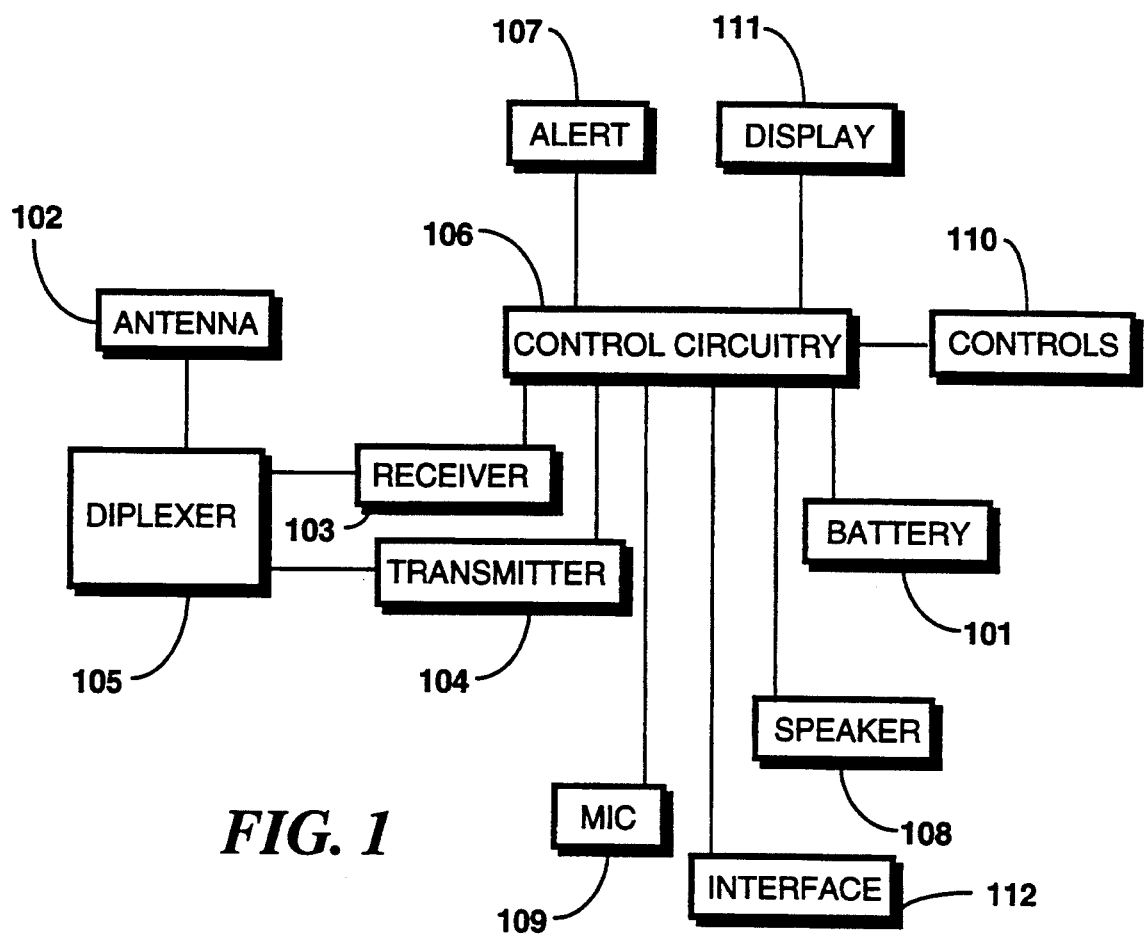
FIG. 1 is a block diagram of a radio telephone with a programming interface.

Referring to FIG. 1, a block diagram is shown of the battery 101 powered radio telephone. A radio frequency signal is received or transmitted by the antenna 102. The antenna is coupled to the receiver 103 and transmitter 104 by a diplexer 105. The diplexer 105 provides switching means and mutual isolation for the radio frequency transmitter and receiver paths respectively. The received signal is routed from the receiver 103 to the control circuitry 106 that recovers any information contained within the received signal. This recovered information is then used to activate the alert 107 (a ringer in the case of a cellular radio telephone) and after answering the call, sustain the connection. When a connection is completed, the user aurally communicates with the other party via the speaker 108 and a microphone 109. Recovered audio from the control circuitry 106 is routed to the speaker which converts electrical energy into acoustical energy thus enabling the user to hear any communications. The microphone 109 is used to convert acoustic energy into electrical energy for use by the control circuitry 106 in modulating the radio frequency carrier produced by the transmitter 104. The user may initiate a call by selecting the proper control 110 and dialing the number of the party to be contacted. When dialed, the number is presented on a display 111 to provide visual feedback for the user.

In accordance with the present invention, information is exchanged between the programmer (not shown) and radio telephone via a communication interface 112. The communication interface 112 allows information exchange using digital serial or parallel word oriented data formats. The word length in bits is defined according to the data throughput requirements of the programming action. When a large amount of data is to be exchanged between the programmer and the radio telephone, the serial data rate can be increased or the parallel word length and data rate can be increased. In this particular embodiment of the programming system, the word length is chosen at 8 bits. With the present integrated circuit technology, the choice of an 8 bit word size results in an economical, efficient hardware design as well as easing the task of developing software for the programmer. The present embodiment utilizes a physical electrical contacting scheme as a coupling means to transfer data between the programmer and radio telephone. Is is clear to one skilled in the art that the coupling means can be constructed in a variety of different ways (e.g. optical, acoustic, etc.) using any media capable of carrying information transmissions.

Figure 2:
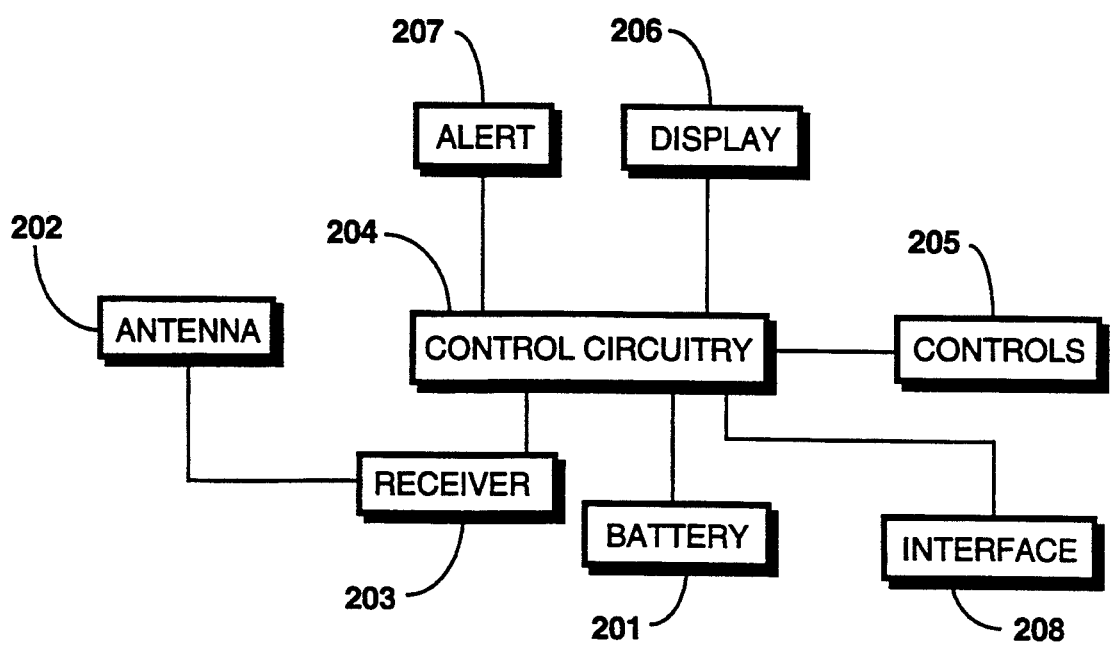
FIG. 2 is a block diagram of a selective call receiver with the programing interface.

Referring to FIG. 2, a block diagram is shown of the battery 201 powered selective call receiver. The selective call receiver operates to receive a signal via an antenna 202. The received signal is routed from the antenna 202 to the receiver 203. The receiver 203 demodulates the received signals using conventional techniques and forwards the demodulated signal to the control circuitry 204, which decodes and recovers information contained within the received signal. In accordance with the recovered information and user controls 205, the selective call receiver presents at least a portion of the information, such as by a display 206, and signals the user via a sensible alert 207 that a message has been received.

In accordance with the present invention, the selecting call receiver is able to exchange information (communicate) with the programmer by using an interface 208 as described for the radio telephone shown in FIG. 1. The selective call receiver shown in FIG. 2 contains control circuitry 204 which may include a custom linear support integrated circuit (not shown) and microprocessor (not shown) with integrated EEPROM (electrically erasable programmable read only memory). The linear support integrated circuit acts to provide ancillary support interfaces to drive the display 206 and alert transducer 207 as well as accept and provide control signals from the controls 205, interface 208, and receiver 203. When a low power CMOS microprocessor is used as the primary control device in the control circuitry 204, the linear support integrated circuit is typically required to optimize system power comsumption and overall efficiency. Present CMOS microprocessor technology does not lend itself to the integration of the primary controller and linear support functions into a single integrated circuit. As can be realized by one skilled in the art, the development of a totally integrated controller in the near future using BIMOS (integrated bipolar/CMOS) technology is very possible and desirable. Since the functions achieved by the radio telephone and selective call receiver shown in FIG. 1 and FIG. 2 respectively, are quite similar, any advances in technology pertaining to one system can be applied directly to the other.

Figure 3:
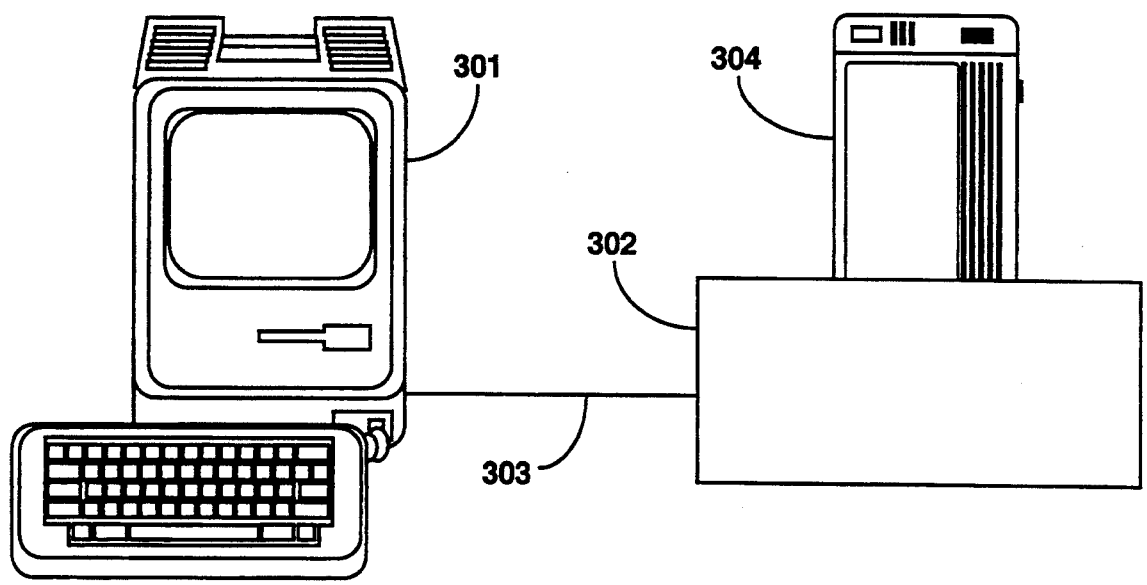
FIG. 3 is a diagram of a programing system.

Referring to FIG. 3, a system diagram is shown of the preferred embodiment of the selective call receiver programing system. A microcomputer system 301 such as an IBM personal computer or Apple Macintosh computer (hereafter referred to as a PC) executes a software program that exchanges information with the programmer 302 via a conventional communication link 303 (e.g. serial standards RS-232, RS-422, or CENTRONICS parallel). In the preferred embodiment the communication link 303 is a serial RS-232 interface running at 9600 baud (9,600 communication symbols or in this case 8 bit words exchanged between the programmer and the PC per second). The radio device 304 is inserted into the programmer 302 for reading, writing, and verifying the programming information contained within the radio device 304. Electronic signals are coupled from the programmer 302 to the radio device 304 that convey the commands controlling the reading, writing, and verifying of information contained within the radio device 304.

Figure 4:
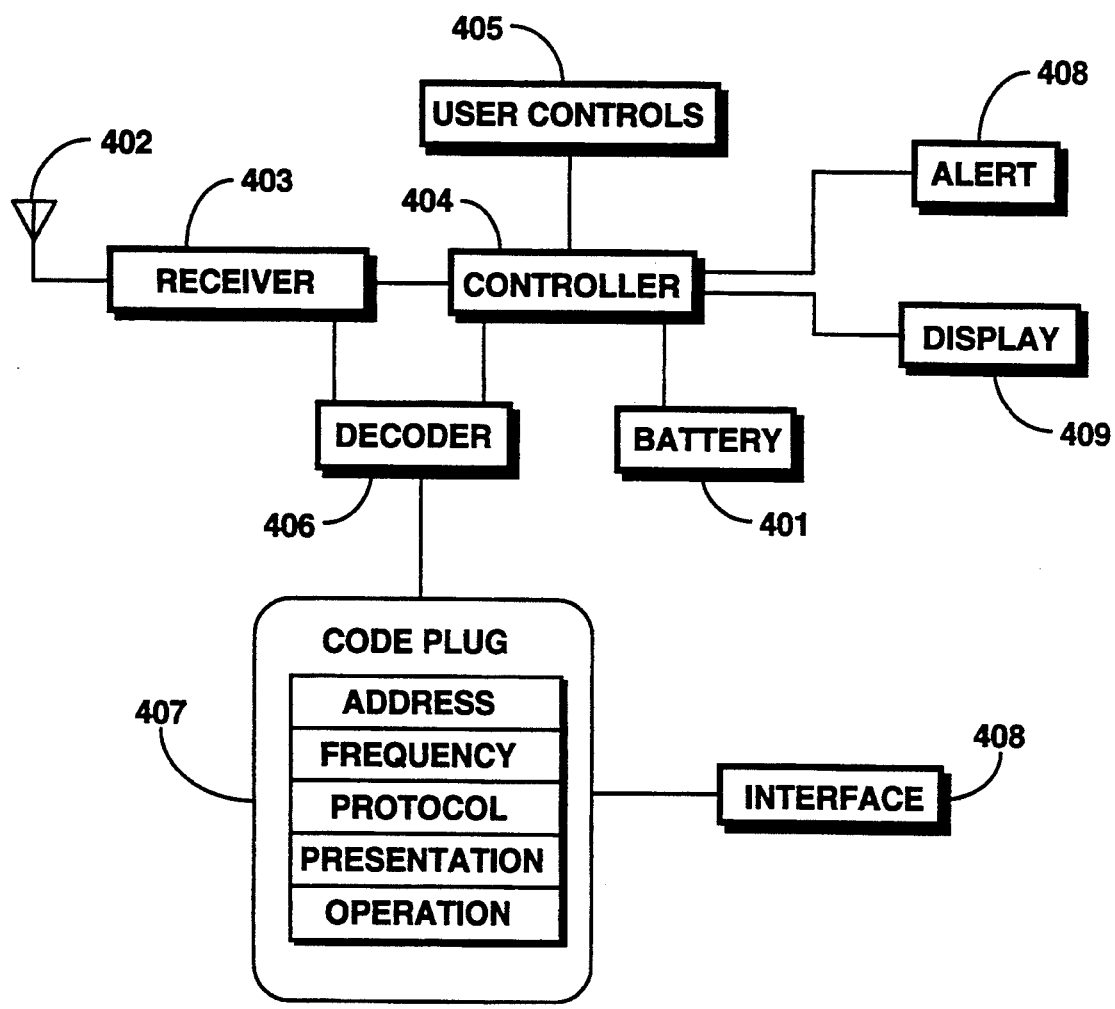
FIG. 4 is a block diagram of a selective call receiver with the programming interface and showing the options contained in a typical code plug.

Referring to FIG. 4, a block diagram is shown of the battery 401 powered selective call receiver. The selective call receiver operates to receive a signal via an antenna 402. The received signal is routed from the antenna 402 to the receiver 403. The receiver 403 demodulates the received signals using conventional techniques and forwards the demodulated signal to a custom integrated circuit controller 404, which is coupled to a decoder 406 that correlates recovered information contained within the received signal to at least one predetermined address contained within the code plug 407. In accordance with the recovered information and user controls 405, the selective call receiver presents at least a portion of the information, such as by a display 409, and signals the user via a sensible alert 408 that a message has been received. Information is exchanged between the programmer (not shown) and selective call receiver via a communication interface 410. Note that the interface connects directly to the code plug 407 in this embodiment of a selective call receiver. This selective call receiver is a cost reduced version of a standard selective call receiver in that it does not use a microprocessor as its controller 404. The selective call receiver's options are configured by programing the code plug 407 which is then read by the decoder 406. The decoder 406 in conjunction with the controller 404 sets the operating mode of the selective call receiver. This particular embodiment exchanges information between the programmer and selective call receiver using an interface standard developed by Motorola known as SPI (serial peripheral interface). For a more detailed description of the SPI interface see the Motorola publication "Microprocessor, Microcontroller, and Peripheral Data, Volume I", MOTOROLA INC., 1988, pp.3-932 to 3-938 which is hereby incorporated by reference. This standard allows a master/slave buss style communication link to be established between devices sharing a common 5 signal interface. The programmer acts as the master and the selective call receiver's code plug 407 which incorporates the SPI circuitry acts as the slave. When communication is established, both devices can communicate via the MISO (master in/slave out) and MOSI (master out/slave in) communication ports. The data is clocked between master and slave using a SCK (serial clock) signal that is supplied by the master device. Using this configuration a low cost selective call receiver or radio telephone can be manufactured that does not require a microprocessor.

Figure 5:
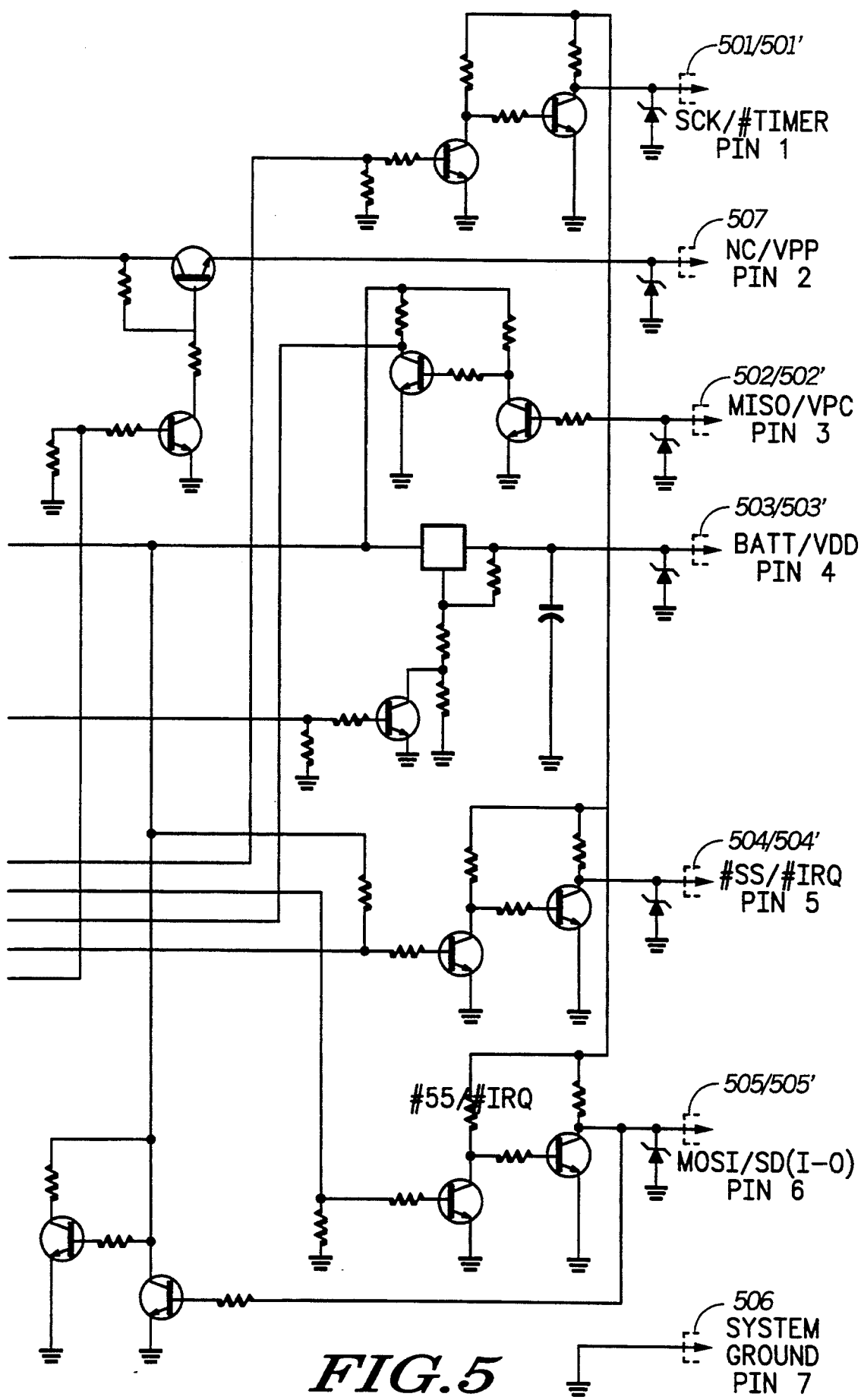
FIG. 5 is a schematic of an implementation of a programming interface circuit in accordance with the preferred embodiment of the present invention.

Referring to FIG. 5, the schematic shows the programmer communication interface circuitry. The output signals provided for programming consist of two separate sets, a first for programming, reading, and verifying SPI interfaced non-microprocessor based radios, and a second for programing microprocessor based radios.

The first signal set corresponds to a non-microprocessor based radio and comprises a SCK (serial clock) 501, MISO (master in/slave out) 502, low B+ 503 with a maximum DC magnitude of 3.2 volts, #SS (slave select active low) 504, MOSI (master out/slave in) 505, and system ground 506 signal. The signals are all referenced to the low B+ 503 signal as its maximum provides the selectable pull-up voltage available at the open collector transistor interface outputs. The low B+ 503 value is selected to prevent damage to any radio connected to the interface regardless of the interface present on that radio. This allows the application of the low output voltages to an incompatible interface while determining its functionality, without causing damage to that interface. Programming is accomplished by applying low B+ 503 to the radio, asserting #SS (slave select active low) 504, then clocking data between the radio and programmer with the SCK (serial clock) 501, MISO (master in/slave out) 502, and MOSI (master out/slave in) 505 signals. Verification (reading) of the programmed data is accomplished by reading the data received by the programmer at the MISO (master in/slave out) 502 port.

The second signal set corresponding with microprocessor based radios comprises a #TIMER 501' (deadman timer disable active low), VPP 507 (high value programming voltage), VPC 502' (high value programming voltage control), VDD 503' (high B+ with a maximum DC magnitude of 5.0 volts), #IRQ 504' (interrupt request disable active low), SD I-0 505' (serial data input/output), and system ground 506' signal. The signals are all referenced to the VDD 503' signal as its maximum provides the selectable pull-up voltage available at the open collector transistor interface outputs. This allows the use of conventional (off the shelf) microprocessor and support circuitry to be used in microprocessor based radios. The VPP 507 signal at a nominal DC magnitude of 25 volts, allows the use of conventional (off the shelf) EEPROM's with microprocessor based radios. The #IRQ 504' (interrupt request disable active low) and #TIMER 501' (deadman timer disable active low) signals disable the microprocessor's interrupt request and linear support integrated circuit's deadman timer that otherwise must be read at regular intervals by the radio being programmed. This permits an executable program other than the ROM routine contained within the radio being programmed to be executed by the radio. The reason for programming in this manner is that the high voltage applied when using conventional EEPROM's is enabled by the pager itself after a downloaded program has set-up the radio's circuitry for programming. When the radio is ready to accept programming data, the radio asserts the VPC 502' signal true causing the programmer to apply the VPP 507 signal to that radio and send programing data to the radio via the SD I-O 505' (serial data input/output) port. Verification (reading) of the programmed data is accomplished by reading the data received by the programmer at the SD I-O 505' (serial data input/output) port. Communications on the SD I-O 505' (serial data input/output) port are half duplex (one way) and are able to be controlled by either the programmer or radio being programed.

Figure 6:
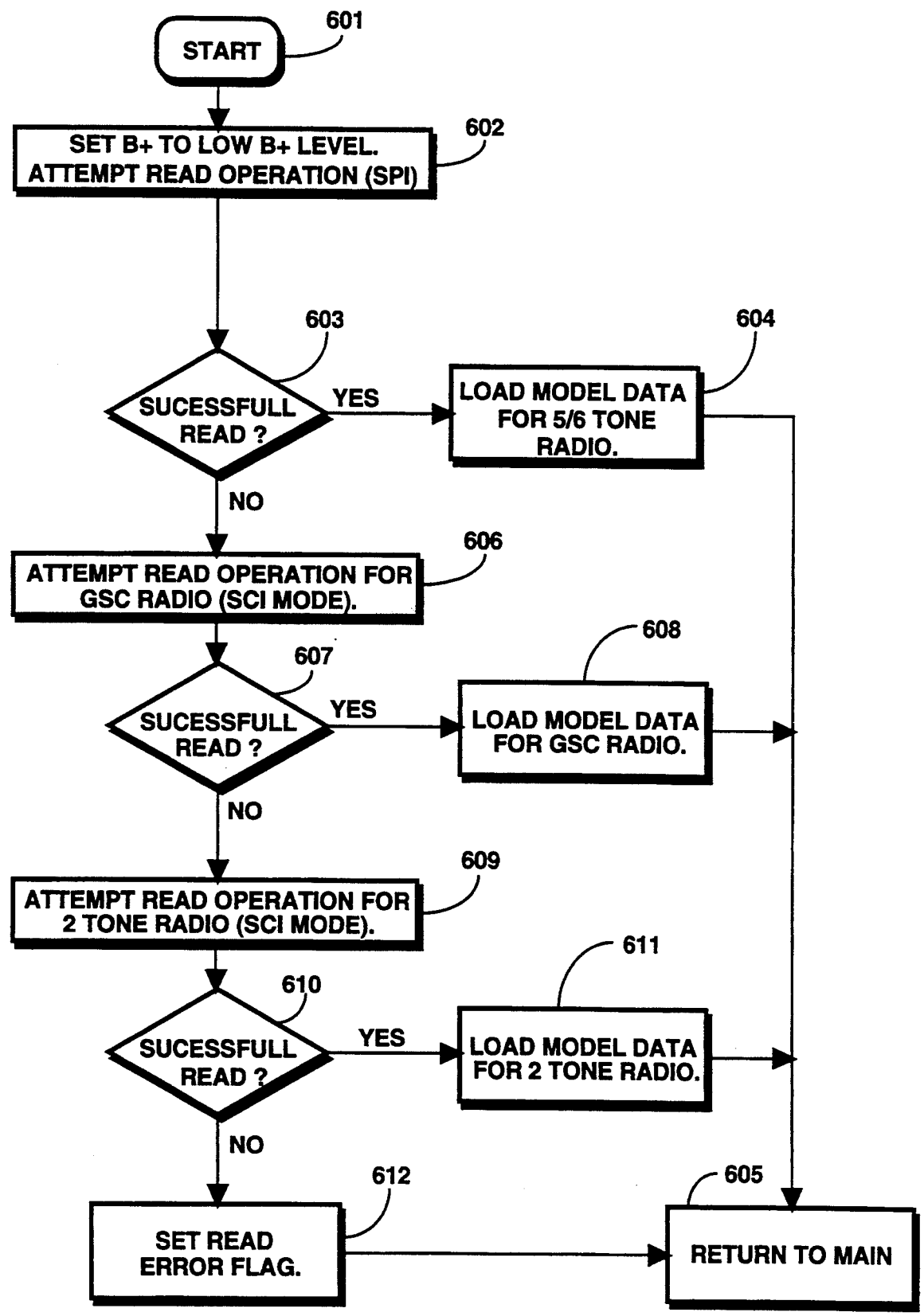
FIG. 6 is a flow diagram of the algorithm for automatically detecting the unit model to be programed.

Referring to FIG. 6, the diagram shows the algorithm for the automatic recognition of both microprocessor and non-microprocessor based radios. The flow starts 601 with the MAIN program sending a command to the programmer that tells the programmer's software to initialize the radio power voltage at the low B+ level 602 and attempting a SPI write/read operation on the radio. If this operation is successful 603, the model data that corresponds to the 5/6 tone signalling format non-microprocessor based radio is loaded 604 and the routine returns to the MAIN 605 program for configuring the recognized radio's options. The MAIN program is executed on a PC that is coupled to the programmer via a communications link. It contains the option configuration selections, screen drivers, model data tables, and other support routines required for radio programing and servicing. For more information on the MAIN program and programing system in general, see the publication "KeyNote SERIES Radio Programming Software", MOTOROLA INC., 1989, pp. 8, which is hereby incorporated by reference. If the write/read SPI operation fails, the algorithm increments to the next predetermined model and attempts a SCI read 606 operation. Note that no predetermined token is read from an SPI interfaced radio and that the model type is determined solely by the functionality or lack of as determined by the write/read operation. An SCI read is attempted for all remaining models which in this case are microprocessor based radios using GSC (Golay Sequential Code signalling) 606 and 2 tone (2 tone sequential signalling) 609 schemes. If the GSC (Golay Sequential Code signalling) 606 read is successful 607, the appropriate model data is loaded 608 and the routine returns to the main 605 program for configuring the recognized radio's options. If the GSC (Golay Sequential Code signalling) 606 read. If the GSC (Golay Sequential Code signalling) 606 read fails, the flow proceeds to the 2 tone (2 tone sequential signalling) 609 read step. If the 2 tone (2 tone sequential signalling) 609 read is successful 610, the appropriate model data is loaded 611 and the routine returns to the main 605 program for configuring the recognized radio's options. If the 2 tone (2 tone sequential signalling) 609 read fails, control is passed to step 612, the READ error flag is set indicating that no successful communications have occured, and the program flow returns to the MAIN program 605.

After successful recognition of a model by the programmer, the MAIN program automatically invokes the correct model information and presents the appropriate programming screens to the user. This allows the user to determine the model data with no prior knowledge of the previous configuration.

I claim:

1. A method for automatically recognizing and configuring one of a non-microprocessor and a microprocessor based radio frequency communication device utilizing an electronic code plug programming apparatus, wherein the non-microprocessor based radio frequency communication device includes an electronic code plug embodied in an application specific integrated circuit and the microprocessor based radio frequency communication device includes an electronic code plug coupled with the microprocessor, said method comprising the steps of:

(a) attempting communication of a direct code plug read request between the electronic code plug programming apparatus and an undetermined radio frequency communication device, the electronic code plug programming apparatus using a first signal set that enables communication with a non-microprocessor based radio frequency communication device when using a first communication interface configuration to effect said attempt;

(b) recognizing the undetermined radio frequency communication device as being the non-microprocessor based radio frequency communication device when step (a) is successfully completed;

(c) attempting communication of a serial communication read request between the electronic code plug programming apparatus and the undetermined radio frequency communication device when step (a) is not successfully completed, the serial communication read request being performed by the electronic code plug programming apparatus using a second signal set and a second communication interface configuration to effect said attempt;

(d) recognizing the undetermined radio frequency communication device as being the microprocessor based radio frequency communication device when step (c) is successfully completed;

(e) selecting, in response to recognizing the undetermined radio frequency communication device, a programming routine corresponding therewith; and (f) configuring operational parameters of said recognized one of the microprocessor and non-microprocessor based radio frequency communication device using the selected programming routine.

2. An electronic code plug programming apparatus capable of automatically recognizing and configuring a radio frequency communication device, the electronic code plug programming apparatus comprising:

a communication interface coupled to an undetermined radio frequency communication device, the communication interface operating in either a first communication interface configuration using a first signal set that enables communication with a non-microprocessor based radio frequency communication device and a second communication interface configuration using a second signal set that enables communication with a microprocessor based radio frequency communication device; and controller means coupled to said interface for:

attempting communication of a direct code plug read request with said undetermined radio frequency communication device, and upon a successful communication of the direct code plug read request therewith, recognizing said undetermined radio frequency communication device as the non-microprocessor based radio frequency communication device without reference to a prestored signal therein, and executing a non-microprocessor based radio frequency communication device programming routine that configures operational parameters therein, and when communication with said non-microprocessor based radio frequency communication device is not successful:

attempting communication of a serial communication read request with said undetermined radio frequency communication device, and upon a successful communication of the serial communication read request therewith, recognizing said microprocessor based radio frequency communication device without reference to a prestored signal therein, and providing a microprocessor based radio frequency communication device programming routine thereto for configuring operational parameters therein.

3. The electronic code plug programming apparatus according to claim 2 where in response to a communication failure when attempting to communicate with the non-microprocessor based and the microprocessor based radio frequency communication devices using corresponding first and second signal sets and communication interface configurations, the controller means, using the second communication interface configuration and a third signal set that enables communication with a subsequent microprocessor based radio frequency communication device, operates to execute a successful subsequent communication receive operation therewith that serves to uniquely identify the subsequent microprocessor based radio frequency communication device without reference to a prestored signal within the subsequent microprocessor based radio frequency communication device, the controller means further operating, in response to the successful subsequent communication receive operation, to provide a subsequent microprocessor based radio frequency communication device programming routine thereto for configuring the subsequent microprocessor based radio frequency communication device.

4. The electronic code plug programming apparatus according to claim 3 wherein the subsequent microprocessor based radio frequency communication device programming routine is executed by the subsequent microprocessor based radio frequency communication device to effect operational changes therein.

5. The electronic code plug programming apparatus according to claim 2 wherein the microprocessor based radio frequency communication device programming routine is executed by the microprocessor based radio frequency communication device to effect operational changes therein.

6. An electronic code plug programming apparatus for programming an automatically recognized radio frequency communication device, the electronic code plug programming apparatus comprising:

a communication interface for coupling to an undetermined radio frequency communication device, said communication interface further being capable of operation in at least a first communication interface configuration using a first signal set that enables communication with a non-microprocessor based radio frequency communication device and a second communication interface configuration using a second signal set that enables communication with a microprocessor based radio frequency communication device; and controller means coupled to said communication interface for recognizing the undetermined radio frequency communication device by receiving the first signal set indicating successful communication with said non-microprocessor based radio frequency communication device without reference to a prestored signal therein and, when successful, executing a non-microprocessor based radio frequency communication device programming routine to configure said non-microprocessor based radio frequency communication device, and when not successful, for receiving the second signal set indicating successful communication with said second microprocessor based radio frequency communication device without reference to a prestored signal therein and, when successful, providing a microprocessor based radio frequency communication device programming routine thereto.

7. The electronic code plug programming apparatus according to claim 6 wherein the microprocessor based radio frequency communication device programming routine is executed by the microprocessor based frequency communication device to effect operational changes therein.

* * * * *